United States Patent Office 3,031,903
Patented May 1, 1962

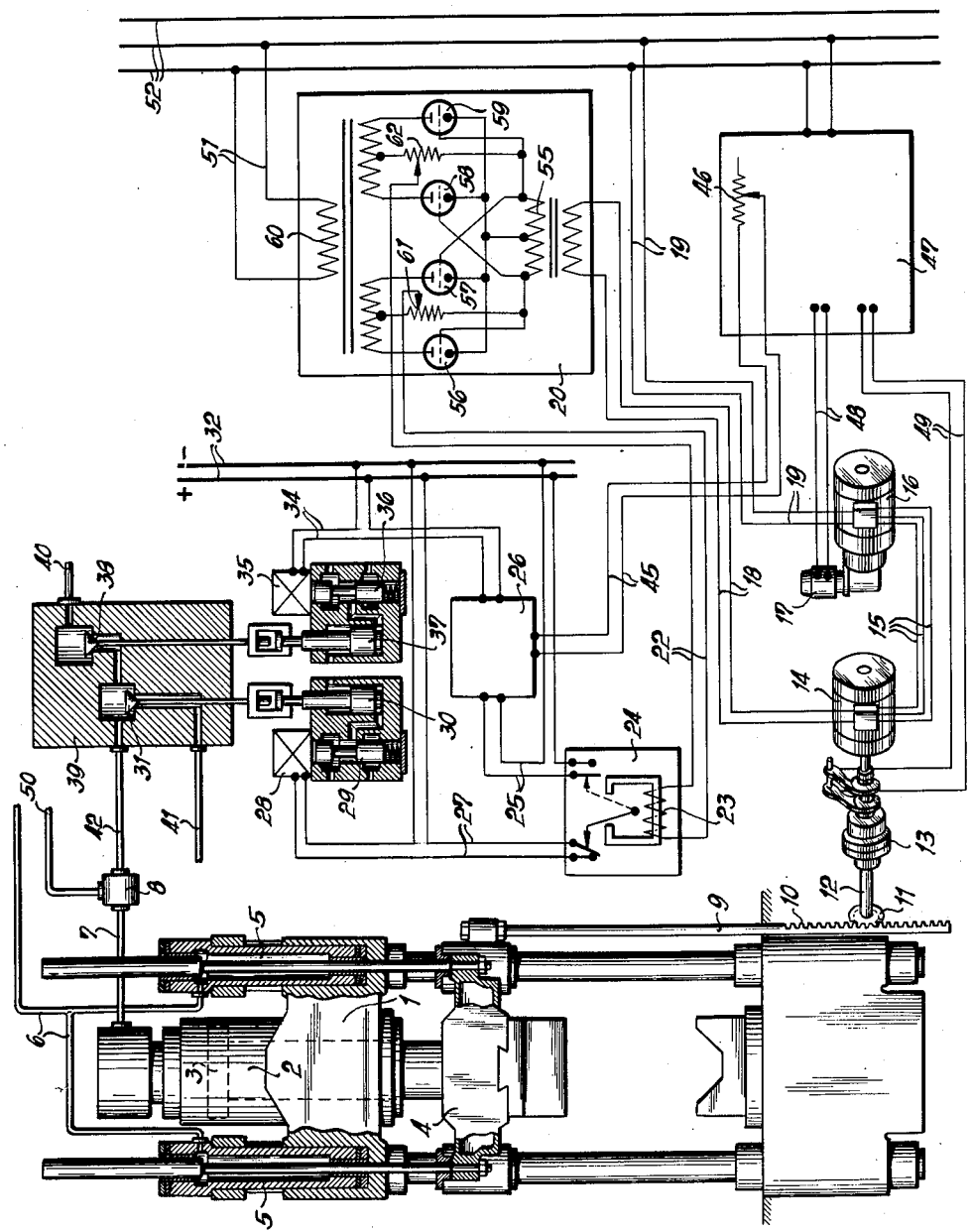

3,031,903
CONTROL OF HYDRAULIC FORGING PRESSES
Peter Billen, Leverkusen-Kuppersteg, Helmut Robra, Mulheim, Ruhr, Wolfgang Müller, Dusseldorf, and Hans Vievering, Duisburg-Huckingen, Germany, assignors to Schloemann Aktiengesellschaft, Dusseldorf, Germany
Filed May 11, 1959, Ser. No. 812,249
Claims priority, application Germany May 12, 1958
4 Claims. (Cl. 78—42)

This invention relates to controlling means for a hydraulic forging press, with a control member which is moved by the sliding platen or cross-beam, and by which, upon the attainment of two end positions in opposite directions alternately, a control element of a reversing device actuates one or the other of two control circuits, and thereby initiates the downward or upward movement of the sliding cross-beam alternately. The object of the invention is to provide a quick forging device which will render it possible to vary, and in particular to increase, the number of strokes per unit of time, with or without a change in the mid point of the stroke, that is, the zero position of the sliding cross-beam, with as little consumption as possible of the power of the press.

A further object of the invention is to render possible a very precise control of the press, and a quick adjustment of the press to different magnitudes of stroke.

Known automatic quick forging devices work in such a way that the sliding cross-beam, upon reaching a predetermined depth, automatically reverses the press, by means of limit switches for example, as a result of which the sliding cross-beam is guided upwards again. The downward movement is likewise automatically initiated by limit switches, when the re-ascending sliding cross-beam has reached a predetermined height. During the upward or downward movement the pressure-water valves are fully opened, so that the speeds of the sliding cross-beam in both directions are about equal, irrespectively of whether the predetermined reversal points of the sliding cross-beam are at a greater or a less distance from one another. If it is desired to attain a large number of strokes of the press per unit of time, the distance between the points of reversal must be diminished; if a small number of press strokes per unit of time is wanted, the distance between the reversal points must be increased. This latter involves long strokes, and therefore a great consumption of pressure water. On the other hand the range of stroke should be adjustable as sensitively as possible in order to obtain an accurate smooth dimension, that is, an accurate finished dimension. When using limit switches, however, this is only very circumstantially and comparatively inaccurately attainable by displacement.

The problem of the invention is, so to improve the controlling of forging presses, particularly in smooth-forging, that is, finish-forging, that by means of an automatic reversing device, independently of the desired number of strokes per unit of time, while avoiding the disadvantages mentioned, work can be carried on with very small strokes, and an automatic fine-adjustment of the mid position of the stroke, that is, of the zero position of the sliding cross-beam, is possible, for the purpose of operating the press economically. Accordingly a greater accuracy of forging in smooth-forging is also obtained.

According to the invention, in the control of the press, and particularly of a forging press for smooth-forging, the stroke movement of the sliding cross-beam is transmitted, by way of a rod, comprising for instance a toothed-rack drive, to an inductive remote-control member, which in its turn produces a voltage vector which is proportional to the instantaneous position of the sliding cross-beam, and which is compared, in a phase-detector circuit, with a constant voltage vector. When the two vectors are in agreement, the magnitude of the output is zero, and this corresponds to a definite zero position of the sliding cross-beam. Above or below this zero position the comparison of the vectors yields a positive or negative direct voltage, which is used for the alternate control of the inlet or outlet valve for the pressure water. This is effected by supplying the positive or negative direct voltage coming from the phase detector to a reversing relay, which in its turn, in the case of a positive direct voltage for example, by way of an exciter conductor, switches on an electrical time relay, which, after a desired time lag, actuates by way of a further exciter conductor a lifting magnet for the admission valve for water under pressure, and in the case of a negative direct voltage, by way of an exciter conductor, directly actuates a lifting magnet for the pressure-water outlet valve.

A further feature of the invention is that with the inductive remote-control member moved by the sliding crossbeam is associated a further inductive remote-control member, which is stationary, and is adjustable by means for example of a control motor, whereby the zero position of the sliding cross-beam can be varied. This occurs in that the variable voltage vector is once more additionally varied in its phase position, as a result of which the zero position of the sliding cross-beam is positively shifted. The inductive remote-control member moved by the sliding cross-beam is connected by way of a releasable clutch with the rod carrying the toothed-rack drive for example.

The coupling is always effected first at the beginning of the automatic smooth-forging operation, so that this operation immediately starts exactly at the place to which the sliding cross-beam had already been moved by means of the manually actuated main control. This device may also advantageously be employed when a sudden displacement of the stroke range becomes necessary, for instance when the work-piece has discontinuities. The control is so constructed that upon operation of a push-button the clutch is released, and the main control is automatically so controlled that the sliding cross-beam moves steadily upwards or downwards. The time relay, known in itself, employed as a retarding element, is adjustable by means of a potentiometer located at the control desk.

The advantage of this control over that hitherto known is that in the case of a small smooth stroke and a different number of strokes, only a slight consumption of pressure water is necessary in quick forging, so that the press works extremely economically. Moreover the zero-point adjusting of the sliding cross-beam renders possible a sensitive adjustment of the lower dead centre of the sliding cross-beam to the machining dimension of the work-piece.

One constructional example of the invention is illustrated in the accompanying drawing, which shows a circuit diagram of the quick-forging control.

By 1 is denoted a forging press, the press cylinder 2 of which guides a piston 3, which transmits the pressure of the press to a sliding platen or cross-beam 4. Laterally of the press cylinder 2 are provided return cylinders 5. The return cylinders 5 are connected, by means of piping 6, with a hydraulic accumulator, not shown, while the press cylinder 2 is connected by means of a pipe 7 with a distributor 8. The distributor 8 has one position in which it connects the pressure pipe 7 with a pipe 50, which leads from the main control, not shown, and shuts off a pipe 42, and another position, in which it connects the pipe 7 with the pipe 42, and shuts off the pipe 50. The distributor 8 can be adjusted either by hand, or by any convenient remote control, not shown, from a control desk 47. To the cross-beam 4 is secured an operating rod 9, comprising a toothed rack 10, which meshes with a pinion 11, which is connected, by way of a shaft 12 and an electro-magnetic clutch 13, with an inductive remote-control member 14. The inductive remote-control member 14 is connected by way of electrical conductors 15 with a further inductive remote-control member 16, which is adjustable by means of a control motor 17. The inductive remote-control member 14 is connected by way of electrical conductors 18 with a phase-detector circuit 20, while the inductive remote-control member 16 is connected by way of electrical conductors 19 with network conductors 52. The phase-detector circuit 20 has electrical conductors 22, which lead to a winding 23 of a polarized reversing relay 24. The reversing relay 24 is connected by means of electrical conductors 27 with the winding of a lifting magnet 28 which in its turn, by way of a slide-valve 29, actuates a lifting piston 30 controlling a pressure-water outlet valve 31. The reversing relay 24 is also connected, by way of electrical conductors 25, to a time relay 26, which is connected, by way of electrical conductors 34, with the winding of a lifting magnet 35, which in its turn, by way of a slide valve 36, actuates a lifting piston 37 controlling a pressure-water inlet valve 38. The valves 31 and 38 are arranged in a casing 39, which is connected with a pressure-water supply pipe 40, a waste-water pipe 41 and a pressure-water delivery pipe 42. Electrical conductors 45 lead from the time relay 26 to a potentiometer 46, which is adjustable from the control desk 47. The control motor 17 of the remote-control member 16, and the electro-magnetic clutch 13, are likewise operable from the control desk 47, by way of electrical conductors 48 and 49 respectively. The distributor 8 has a pipe 50 which leads from the main control, not shown. The conductors 25, 27 and 34 are connected with direct current-supply conductors 32.

The apparatus described operates in the following manner: In coarse forging with the aid of the main control, not shown, the clutch 13 is opened, and the distributor 8 connects the pipe 7 with the pipe 50.

By a corresponding actuation of the main control, pressure liquid is passed, by way of the supply pipe 50, the distributor 8 and the pipe 7, into the cylinder 2, until the sliding cross-beam 4 assumes the lower reversing position that is necessary for the size of the forging. This lower reversing position is important, inasmuch as the height of the work-piece between the press ram and the anvil or the like diminishes when the lower reversing point is displaced downwards. If the lower reversing point is raised, the height of the workpiece becomes greater.

During the descent of the platen the pressure water present in the return cylinders 5 is in part forced back into the accumulator. A change-over is then made to "smooth-forging," in that first the distributor 8 is so adjusted that it connects the pipe 7 with the pipe 42 and shuts off the pipe 50, and in that secondly, from the control desk 47, by way of the conductors 49, the electro-magnetic clutch 13 is closed. Thus this clutch is closed at a time when the platen is in its adjusted lower reversing position, which constitutes its starting position. The rod 9, through the medium of the rack 10 and the pinion 11, now co-operates, owing to the closing of the clutch on the shaft 12, with the inductive remote-control member 14. After this first closing of the clutch, the shaft 12 is therefore rotated to and fro, together with the control member 14, first during the ascent of the platen 4 and then during its descent. In each of these movements the inductive remote-control member 14 produces a voltage vector proportional to the position of the cross-beam 4, and this voltage vector is supplied, by way of the conductors 18 and a transformer 55, to the grids of the valves 56, 57, 58 and 59 of the phase detector 20, is thus amplified, and is then compared with a constant voltage vector supplied by way of electrical conductors 51 through a transformer 60. In the event of agreement between the two vectors, the output magnitude furnished is zero, which corresponds to a definite zero position of the cross-beam 4. Above this position the vector comparison furnishes a positive direct voltage, and below it a negative direct voltage. This direct voltage is picked up between the reference points 61 and 62. Its sign is dependent upon the upward movement of the cross-beam 4, referred to its zero position. The direct voltage is supplied by way of the conductors 22 to the winding 23 of the polarised reversing relay 24 which in its turn, by way of the conductors 25, actuates the electrical time relay 26, which, after the ascent of the cross-beam 4 has been stopped at the selected upper reversing point by the closing of the valve 31, and, after the delay adjusted by means of the potentiometer 46 from the control desk 47, excites the winding of the lifting magnet 35 by way of the conductors 34, and maintains the excitation of this magnet winding for the length of time adjusted in the relay 26. The lifting magnet 35, by way of the slide-valve 36 and the lifting piston 37, opens the pressure-water inlet valve 38, so that pressure water is passed from the pipe 40, through the valve body 39 and the pipes 42 and 7, to the piston 3 of the press cylinder 2, as a result of which the downward movement of the cross-beam 4 begins. The inductive remote-control member 14 is thus rotated, during the descent of the cross-beam, and produces a voltage vector, which, compared with the constant voltage vector, furnishes a direct voltage, the sign of which, referred to the zero position of the cross-beam 4, in the phase detector 20, is opposite to that produced during the ascent of the cross-beam. This direct voltage is supplied, by way of the conductors 22, to the winding 23 of the polarised reversing relay 24, which, by way of the conductors 27, excites the winding of the lifting magnet 28. The lifting magnet 28, by way of the slide-valve 29 and the lifting piston 30, opens the pressure-water outlet valve 31, so that the pipes 7 and 42 are connected with the waste-water pipe 41. The cross-beam 4 is then moved towards the upper dead-centre position again by the pressure water of the accumulator acting in its return cylinders 5. After the first smooth-forging strokes, in so far as the required dimension of the work-piece has not yet been reached, the control motor 17 of the inductive remote-control member 16 is operated from the control desk 47 by way of the conductors 48, whereby the inductive remote-control member 16 is adjusted in relation to the inductive remote-control member 14, and thus the mid-stroke position of the cross-beam 4 is altered. The turning of the remote-control member 16 effects a change in the exciting voltages furnished by way of the conductors 15 to the remote-control member 14, and therefore a change in the voltage vector furnished by the remote-control member 14 to the phase-detector 20.

We claim:

1. Apparatus controlling the platen of a hydraulic forging press, comprising: a rotatable remote-control member by means of which the platen produces a voltage vector proportional to the particular position thereof, a phase-detector circuit which compares the side voltage vector with a constant voltage vector, a reversing relay to which the phase-detector circuit furnishes a direct voltage the sign of which depends upon the position of the platen in relation to the zero position thereof, a pressure-water inlet valve, an electro-magnet for opening the pressure-water inlet valve, an exciter conductor connecting this electro-magnet with the reversing relay, an electrical time relay interposed in the exciter conductor, a pressure-water outlet valve, a second electro-magnet for opening the pressure-water outlet valve, and a second exciter conductor, by which the reversing relay directly controls the magnet that opens the said outlet valve.

2. Apparatus controlling the platen of a hydraulic forging press as claimed in claim 1, further comprising: second stationary remote-control member means such as a control motor for adjusting this second remote-control member, and thereby displacing the mid-stroke position of the platen.

3. Apparatus controlling the platen of a hydraulic forging press as claimed in claim 1, further comprising: control elements, actuated by the platen, driving the rotatable remote-control member, and a releasable clutch interposed in the drive between the said control elements and the rotatable remote-control member.

4. Apparatus controlling the platen of a hydraulic forging press as claimed in claim 1, further comprising: a control desk and a potentiometer located on the control desk, for adjusting the electrical time relay interposed in the exciter conductor connecting the reversing relay with the electro-magnet that opens the pressure-water inlet valve.

References Cited in the file of this patent

UNITED STATES PATENTS

| | | |
|---|---|---|
| 2,410,283 | Garr | Oct. 29, 1946 |
| 2,652,691 | Hartemann | Sept. 22, 1953 |
| 2,735,405 | Hipple | Feb. 21, 1956 |
| 2,886,010 | Hayos | May 12, 1959 |

FOREIGN PATENTS

| | | |
|---|---|---|
| 782,948 | Great Britain | Sept. 18, 1957 |